[12] United States Patent
Corpart et al.

(10) Patent No.: US 11,299,585 B2
(45) Date of Patent: Apr. 12, 2022

(54) OLIGOCARBONATE POLYOLS OBTAINED FROM DIANHYDROHEXITOL DIALKYLCARBONATE OR A DIMER OF DIANHYDROHEXITOL CARBONATE, METHOD FOR THE PRODUCTION THEREOF AND USES THEREOF

(71) Applicant: ROQUETTE FRERES, Lestrem (FR)

(72) Inventors: Jean-Marc Corpart, Lambersart (FR); René Saint-Loup, Lomme (FR)

(73) Assignee: ROQUETTE FRERES, Lestrem (FR)

( * ) Notice: Subject to any disclaimer, the term of this patent is extended or adjusted under 35 U.S.C. 154(b) by 58 days.

(21) Appl. No.: 16/756,346

(22) PCT Filed: Oct. 15, 2018

(86) PCT No.: PCT/FR2018/052558
§ 371 (c)(1),
(2) Date: Apr. 15, 2020

(87) PCT Pub. No.: WO2019/077250
PCT Pub. Date: Apr. 25, 2019

(65) Prior Publication Data
US 2020/0325273 A1 Oct. 15, 2020

(30) Foreign Application Priority Data
Oct. 16, 2017 (FR) ...................... 17 59690

(51) Int. Cl.
C08G 18/44 (2006.01)
C08G 64/30 (2006.01)
C08G 64/02 (2006.01)
C08G 64/40 (2006.01)

(52) U.S. Cl.
CPC ........... *C08G 64/305* (2013.01); *C08G 18/44* (2013.01); *C08G 64/0208* (2013.01); *C08G 64/403* (2013.01)

(58) Field of Classification Search
USPC ...................................................... 528/212
See application file for complete search history.

(56) References Cited

U.S. PATENT DOCUMENTS

| 8,399,601 | B2 * | 3/2013 | Fuertes | ............... | C07D 493/04 |
|---|---|---|---|---|---|
| | | | | | 528/352 |
| 8,871,895 | B2 | 10/2014 | Ibert et al. | | |
| 9,040,654 | B2 | 5/2015 | Ibert et al. | | |
| 2004/0241553 | A1 | 12/2004 | Abe et al. | | |
| 2005/0065360 | A1 | 3/2005 | Hofacker et al. | | |

FOREIGN PATENT DOCUMENTS

| EP | 2033981 A1 | 3/2009 |
|---|---|---|
| EP | 2559718 A1 | 2/2013 |
| JP | H06261774 A | 9/1994 |
| JP | 2014062202 A | 4/2014 |
| JP | 2014080590 | * 5/2014 |
| JP | 2014080590 A | 5/2014 |
| WO | 2015026613 A1 | 2/2015 |

OTHER PUBLICATIONS

JP2014080590A Machine Translation Inventor: Yoshikazu Kanamori et al. Polycarbonate diol (Year: 2014).*
The English translation of the International Search Report, dated Jan. 17, 2019, in the corresponding PCT Appl. No. PCT/FR2018/052558.

* cited by examiner

Primary Examiner — Terressa Boykin

(57) ABSTRACT

Provided is a method for producing an oligocarbonate polyol devoid of aromatic groups and phenolic functions, comprising a step of polycondensation by transesterification of monomers (A1) and/or dimers (A2) and of diol monomers (B1) and/or of triol monomers (B2), in a particular molar ratio, in order to obtain an oligocarbonate polyol having a molar mass of less than 5000 g/mol and at least two hydroxyl-type chain ends, the monomer (A1) corresponding to the following formula: (A1) and the dimer (A2) corresponding to the following formula: (A2) as well as the oligocarbonate polyol that can be obtained by this method and the polycarbonate that can be obtained by reacting this oligocarbonate with a polyisocyanate.

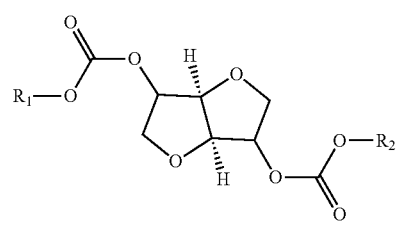

(A1)

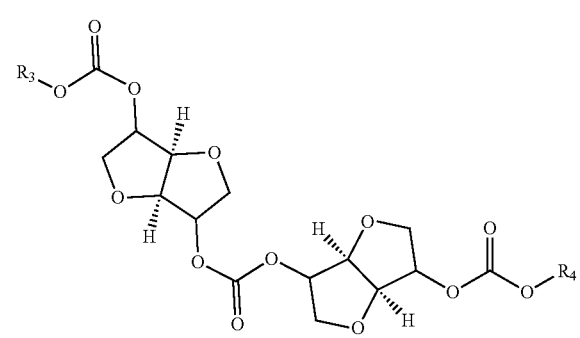

(A2)

18 Claims, No Drawings

OLIGOCARBONATE POLYOLS OBTAINED FROM DIANHYDROHEXITOL DIALKYLCARBONATE OR A DIMER OF DIANHYDROHEXITOL CARBONATE, METHOD FOR THE PRODUCTION THEREOF AND USES THEREOF

This application is a National Stage Application of PCT/FR2018/052558 filed Oct. 15, 2018, which claims priority from French Patent Application No. 17 59690, filed on Oct. 16, 2017. The priority of said PCT and French Patent Application are claimed. Each of the prior mentioned applications is hereby incorporated by reference herein in its entirety.

The present invention relates to novel oligocarbonate polyols obtained by reaction between a dianhydrohexitol bis(alkyl carbonate) and/or a dianhydrohexitol carbonate dimer and another diol and/or triol, under specific reaction conditions and in particular specific conditions of relative amounts of the entities involved.

It furthermore exhibits the advantages of using a dianhydrohexitol, the biosourced origin of which reduces the fossil fuel footprint of the manufactured product, of not using phosgene or generating phenol, like many previous solutions, these two products being hazardous to the user but also prohibited for any application with food contact, of resulting in products of controlled architecture and finally of making possible, with these products, the manufacture of coatings which are particularly resistant to abrasion, to scratching and to UV radiation.

Poly- or oligocarbonate diols are entities which are today well known and which find numerous applications in the manufacture of adhesives but also of various coatings, such as paints, lacquers and varnishes. One of their well-known applications is the manufacture of coatings of polyurethane resin type. In the same way as ether components (polytetramethylene glycol), ester components (in particular starting from adipate) and polylactone components (polycaprolactone base, inter alia), polycarbonate diols constitute one of the starting materials for these polyurethane resins.

Although ethers exhibit a good resistance to hydrolysis, they are less resistant toward light and heat. Esters exhibit a behavior which is diametrically opposite with regard to these same properties. With regard to polycaprolactones, they are also deficient with regard to hydrolysis phenomena. It is for this reason acknowledged that polycarbonate diols exhibit at the present time the best compromise for the purpose of obtaining a long-lasting quality for the final product, in terms of resistance to hydrolysis, to heat and to light. This is particularly important for a coating of polyurethane type, in particular in applications such as exterior paints which are exposed precisely to the abovementioned stresses.

The manufacture of materials of polyurethane type based on polycarbonate polyols is today well described in the literature. By way of example, the document WO 2015/026613 describes a piston seal for a hydraulic pump, said seal being of polyurethane type and obtained by reaction between a polycarbonate-isocyanate prepolymer, a polycarbonate polyol, a diol and a curing agent.

With regard to oligocarbonate diols, their synthesis is also extensively taught in the prior art. These products are prepared from aliphatic polyols which react with phosgene, bischlorocarbonic esters, diaryl carbonates, cyclic carbonates or dialkyl carbonates. Reference may be made, in this regard, to the document US 2005/065360.

As such, while seeking to ensure an excellent level of performance qualities for the poly- or oligocarbonate diols which he manufactures, a person skilled in the art must today incorporate new constraints, in particular in terms of the environment. The development of polymer materials resulting from biological resources which are renewable in the short term has indeed become a major ecological and economic imperative, in the face of the exhaustion and of the rise in costs of fossil resources, such as oil. In this context, the use of dianhydrohexitols, resulting from plant (poly) saccharides, as dihydroxylated monomers in polycondensation reactions appears promising for replacing monomers of petrochemical origin.

A few attempts have been made for the purpose of manufacturing polycarbonate diols incorporating dianhydrohexitols. JP 2014-62202 and JP 2014-80590 are known on this account. The first describes a composition comprising a phosphorus-based compound, a phenolic compound and a polycarbonate diol, the latter having a number-average molecular weight of between 250 and 5000 and exhibiting a molar ratio of hydroxyl groups to end groups at least equal to 95%. The second describes a polycarbonate diol consisting of a diol and of a dianhydrohexitol chosen from isosorbide, isomannide and isoidide, and exhibiting a weight-average molecular weight of between 250 and 5000 as determined by NMR, while having a ratio of number of alkyloxy or aryloxy end groups with respect to the total number of end groups of greater than or equal to 5%.

Nevertheless, these products are obtained by reaction between a diol and the dianhydrohexitol, but also in the presence of diphenyl carbonate. Phenol is thus generated during the synthesis of the polycarbonate diol. In point of fact, phenol is a product which is simultaneously hazardous to the user—both as regards the product and as regards the final application—and prohibited for applications with food contact. The presence of phenol is thus completely unacceptable: it must be distilled off in order subsequently to be removed. This is clearly what is demonstrated in the tests illustrating the two abovementioned patent applications.

The document EP 2 559 718 is also known, which describes the simultaneous reaction between a diol chosen from isosorbide, isomannide and isoidide, another diol and a diester carbonate, such as diphenyl carbonate. A polycarbonate diol is thus obtained here, but with a completely random architecture because, as the diester carbonate is highly reactive, it reacts without preference both with the dianhydrohexitol and with the other diol. As the final properties of the product, such as its resistance to hydrolysis, to light and to heat, are directly related to its architecture, said polycarbonate diol will exhibit properties which fluctuate as a function of its final architecture. This absence of control of the properties cannot be adapted to an industrial use for the product in question.

Thus, for the purpose of manufacturing oligocarbonate polyols advantageously employing a monomer of natural origin, such as a dianhydrohexitol, and in doing so without employing phosgene and without generating phenol during the reaction, and finally while making it possible to regulate the architecture of the product synthesized, the applicant company has succeeded in developing the following process, which consists in reacting a dianhydrohexitol bis(alkyl carbonate) and/or a dianhydrohexitol carbonate dimer with another diol and/or triol, in order to obtain oligocarbonate polyols exhibiting a perfectly controllable and controlled alternating architecture. A molar excess of the other diol and/or triol with respect to the dianhydrohexitol bis(alkyl carbonate) and/or a dianhydrohexitol carbonate dimer makes it possible to obtain hydroxyl end groups.

In so doing, success is thus achieved in solving the technical constraints mentioned above. Furthermore, in the end, polycarbonate diols are obtained which are capable of being used in the manufacture of adhesives and of various coatings, such as paints, lacquers and varnishes. These oligocarbonate polyols can in particular be used to manufacture polyurethane resins with particularly advantageous properties, in terms of resistance to abrasion, to scratching and to UV radiation.

Advantageously, the isosorbide bis(alkyl carbonates) which participate in the reaction are manufactured according to the method described in the patent application WO 2011/039483. This method consists in reacting at least one dianhydrohexitol, at least two molar equivalents of a di(alkyl) carbonate and a transesterification catalyst. Unlike the processes described in the prior art, this method does not generate compounds which are harmful to humans or hazardous to the environment. Thus, the patent application EP 2 033 981 described a synthesis, the drawback of which was the formation of phenol, which subsequently had to be distilled off and removed as reaction byproduct. With regard to the documents US 2004/241553 and JP 06-261774, they were based on the use of toxic chloroformic esters.

SUMMARY

Thus, according to a first aspect, the present invention relates to a process for the manufacture of an oligocarbonate polyol devoid of aromatic groups and of phenolic functional groups, comprising:
a stage (1) of introduction, into a reactor:
of a monomer of formula (A1):

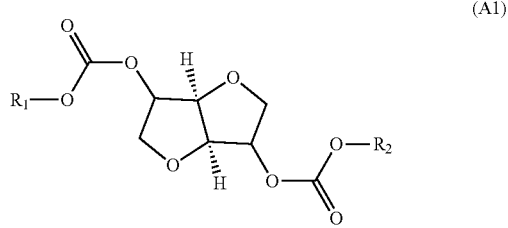

(A1)

in which $R_1$ and $R_2$ are identical or different alkyl groups,
or of a dimer of formula (A2):

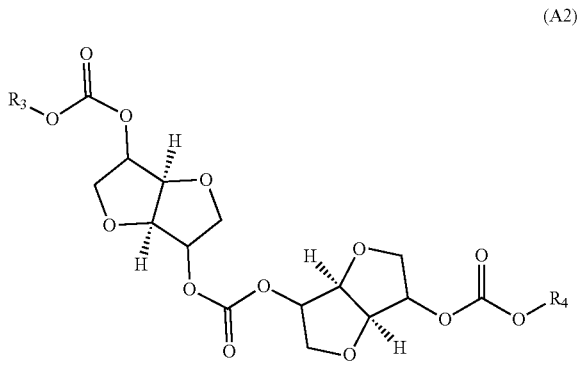

(A2)

in which $R_3$ and $R_4$ are identical or different alkyl groups,
or of a mixture of (A1) and (A2);
a stage (2) of introduction, into the reactor, of a diol monomer (B1) or of a triol monomer (B2) or of a mixture of (B1) and (B2), (B1) and (B2) both being different from (A1) and (A2);
the molar ratio in the reactor of (A1) and (A2) with respect to (B1) and (B2) corresponding to the following formula:

$$\frac{\left[\frac{(A1)}{2} + \frac{(A2)}{2}\right]}{\left[\frac{(B1)}{2} + \frac{(B2)}{3}\right]} < 1,$$

a subsequent stage (3) of polycondensation by transesterification of the monomers and dimers (A1), (A2), (B1) and (B2) in order to obtain an oligocarbonate polyol having a molar mass of less than 5000 g/mol and at least two chain end groups of hydroxyl type,
a stage (4) of recovery of the oligocarbonate polyol.

According to a second aspect, the invention relates to an oligocarbonate polyol capable of being obtained by the process of the invention.

According to a third aspect, the invention relates to a process for the preparation of a polymeric material, intended in particular for the preparation of an adhesive, of a paint, of a lacquer, of a varnish or of a resin, such as a polyurethane resin, characterized in that the oligocarbonate polyol according to the invention is reacted with a monomer exhibiting at least two functional groups each capable of reacting with a hydroxyl functional group.

DETAILED DESCRIPTION

According to the present invention, the term "oligocarbonate polyol" is understood to mean any polymer comprising repeat units, formed by the reaction of monomers or dimers, bonded via carbonate bonds and in particular the repeat units described above, and the chain end groups of which are hydroxyl functional groups. These repeat units are formed by reaction of the monomer (A1) and/or of the dimer (A2) with the monomers (B1) and/or (B2) already presented above.

Within the meaning of the present invention, the term "a monomer" applies to the mixtures of this monomer. In other words, the expression "a monomer (A1)" or "a monomer of formula (A1)" means that only one monomer of formula (A1) is used or else that a mixture of different monomers of formula (A1) is used. A similar meaning is given to the expressions "a monomer (A2)" or "a dimer of formula (A2)", "a monomer (B1)" or "a monomer of formula (B1)", or also "a monomer (B2)" or "a monomer of formula (B2)".

As explained above, the invention relates to a process for the manufacture of hydroxytelechelic oligocarbonates by polycondensation of the monomer (A1) and/or of the dimer (A2) and of the monomers (B1) and/or (B2).

The term "1,4:3,6-dianhydrohexitol" or "dianhydrohexitol" used in the present invention encompasses isosorbide (obtained by dehydration of D-glucitol), isomannide (obtained by dehydration of D-mannitol) and isoidide (obtained by dehydration of D-iditol).

According to the present invention, the term "dianhydrohexitol carbonate dimer" is understood to mean a compound of formula (A2), that is to say consisting of two molecules of dianhydrohexitol monoalkyl carbonate connected together by a divalent carbonate functional group. The compound thus comprises two carbonate end groups in total.

Monomers (A1) and (A2)

The monomer (A1) used in stage (1) can be chosen from isosorbide bis(alkyl carbonate), isomannide bis(alkyl carbonate) and isoidide bis(alkyl carbonate).

The monomer (A1) can contain one or more dianhydrohexitol bis(alkyl carbonates) but preferably contains only one dianhydrohexitol bis(alkyl carbonate), in particular an isosorbide bis(alkyl carbonate), which is available in larger amount and at lower cost than the other two stereoisomers.

The alkyl groups $R_1$ and $R_2$ carried by the monomer (A1) can comprise from 1 to 10 carbon atoms, in particular from 1 to 6 carbon atoms, for example from 1 to 4 carbon atoms, and are very particularly chosen from methyl or ethyl groups.

According to one embodiment, the monomer (A1) is an isosorbide bis(alkyl carbonate), in particular an isosorbide bis(ethyl carbonate) or an isosorbide bis(methyl carbonate).

The monomer (A1) can be obtained by using, for example, the processes already known for the manufacture of dianhydrohexitol bis(alkyl carbonate).

Advantageously, the monomer (A1) is prepared according to the process described in the patent application WO 2011/039483 (on behalf of Roquette Frères) by reacting a dianhydrohexitol with at least two molar equivalents of a di(alkyl) carbonate and a transesterification catalyst. The formation of dimers can be inhibited by the use of a large excess of dialkyl carbonate. This method has the advantage of not generating compounds which are harmful to humans or hazardous to the environment.

The monomer (A1) can also be manufactured by reaction of dianhydrohexitol and of alkyl chloroformate, these reagents being introduced into a reactor in molar proportions of 1:2. This type of process is described, for example, in the document JP 06-261774 in example 5. The applicant company has been able to find that, according to this process, only dianhydrohexitol bis(alkyl carbonate) and no dimer is formed.

The dimer (A2) used in stage (1) is a dimer of (A1). Depending on the dianhydrohexitol used, one or more conformations of dimers (A2) can be obtained.

The dimer (A2) can be chosen from an isosorbide carbonate dimer, an isomannide carbonate dimer or an isoidide carbonate dimer.

The dimer (A2) can contain one or more dianhydrohexitol carbonate dimers but preferably contains only one dianhydrohexitol carbonate dimer, in particular an isosorbide carbonate dimer, which is available in larger amount and at lower cost than the other two stereoisomers.

The alkyl groups $R_3$ and $R_4$ carried by the dimer (A2) can comprise from 1 to 10 carbon atoms, in particular from 1 to 6 carbon atoms, for example from 1 to 4 carbon atoms, and are very particularly chosen from methyl or ethyl groups.

According to one embodiment, the dimer (A2) is an isosorbide carbonate dimer, in particular an isosorbide ethyl carbonate dimer or an isosorbide methyl carbonate dimer.

The dimer (A2) can be manufactured by reacting, for example in a first stage, one mole of dianhydrohexitol with one mole of alkyl chloroformate, in order to form dianhydrohexitol monoalkyl carbonate, and then, in a second stage, one mole of phosgene with two moles of the dianhydrohexitol monoalkyl carbonate formed in the first stage.

Another possibility for manufacturing the monomer (A1) and the dimer (A2) is to use a process which makes possible their simultaneous synthesis. Specifically, the applicant company has also developed a process which makes it possible to manufacture such a mixture. This process is described in detail in the international patent application No. WO 2011/039483.

This preparation process comprises, in order, the following stages:

(a) preparation of an initial reaction mixture containing:
at least one dianhydrohexitol,
at least two molar equivalents, with respect to the amount of dianhydrohexitol present, of at least one dialkyl carbonate, and
a transesterification catalyst, such as, for example, potassium carbonate, (b) heating the reaction mixture to a temperature greater than or equal to the boiling point of the alcohol R—OH formed by the transesterification reaction, or greater than or equal to the boiling point of the azeotropic mixture which the alcohol R—OH obtained forms with another of the components present in the reaction mixture, and at most equal to the boiling point of the reaction mixture, in a reactor equipped with a rectification column comprising a number of theoretical distillation plates which is sufficient to separate, from the reaction mixture, the alcohol obtained or the azeotrope which it forms with another of the components present in the reaction mixture.

The solution obtained at the end of the process comprises a mixture of monomer (A1) and of dimer (A2) with dialkyl carbonate. A distillation is carried out and the mixture of (A1) and (A2) devoid of dialkyl carbonate is recovered. The ratio (A1)/(A2) can be varied by modifying the initial reaction mixture: the latter advantageously contains from 2.1 to 100 molar equivalents, preferably from 5 to 60 molar equivalents and in particular from 10 to 40 molar equivalents of dialkyl carbonate, with respect to the amount of dianhydrohexitol initially present in the reaction medium. The greater the amount of dialkyl carbonate, the greater the ratio (A1)/(A2).

For example, the applicant company has found that, by reacting isosorbide and dimethyl carbonate in the presence of potassium carbonate under the conditions of the process described above, a solution could be obtained comprising (A1) and (A2) with a ratio (A1)/(A2) ranging from approximately 4 (when the dialkyl carbonate/isosorbide ratio is 10) to approximately 20 (when the dialkyl carbonate/isosorbide ratio is 40).

(A1) and (A2) can subsequently be separated by vacuum distillation techniques, for example using a wiped-film evaporator.

This process for the simultaneous synthesis of (A1) and (A2) exhibits the advantages of using reagents which are less toxic than the alkyl chloroformate used in the process described in the document JP 06-261774, for example; the synthesis coproducts are also less toxic than the chlorinated entities emitted during the synthesis with chloroformate (methanol in the case where the alkyl is a methyl, ethanol in the case where the alkyl is an ethyl).

According to one embodiment, only the monomer (A1) is synthesized. Only the latter is introduced into the reactor in stage (1), that is to say that dimer (A2) is not introduced into the reactor.

According to another embodiment, a mixture of monomer (A1) and of dimer (A2) is synthesized. This mixture is introduced into the reactor in stage (1).

Monomers (B1) and (B2)

The diol monomer (B1) and the triol monomer (B2) can be chosen from aliphatic diols or triols, which are in particular linear or branched, or else cyclic, aromatic or nonaromatic diols or triols.

In one embodiment, the diol (B1) or the triol (B2) comprises from 2 to 14 carbons.

The linear (unbranched) aliphatic diol can be chosen from the following diols: ethylene glycol, 1,3-propanediol, 1,4-butanediol, 1,5-pentanediol, 1,6-hexanediol, 1,8-octanediol, 1,10-decanediol, preferentially ethylene glycol, 1,4-butanediol or 1,6-hexanediol.

The linear aliphatic triol can be chosen from the following triols: glycerol, 1,2,4-trihydroxybutane, 1,2,5-trihydroxypentane or 1,2,6-trihydroxyhexane.

The branched aliphatic diol (with unreactive pendant chains) can be chosen from the following diols: 1,2-propanediol, 1,3-butanediol, 2,3-butanediol 1,3-pentanediol, 1,4-hexanediol, 2,2-dimethyl-1,3-propanediol, 3-methyl-1,5-pentanediol, 2,2-dimethyl-1,3-propanediol or 2-methyl-1,3-propanediol.

The cyclic diol or triol can comprise one or more rings, for example from two to four rings, preferentially two rings. Each ring preferentially comprises from 4 to 10 atoms. The atoms included in the rings can be chosen from carbon, oxygen, nitrogen or sulfur. Preferentially, the constituent atoms of the ring are carbon or carbon and oxygen.

The aromatic diol preferably comprises from 6 to 24 carbon atoms.

The nonaromatic cyclic diol can comprise from 4 to 24 carbon atoms, advantageously from 6 to 20 carbon atoms.

The cyclic aliphatic diol can be chosen in particular from the following diols:
- dianhydrohexitols, such as isosorbide, isomannide and isoidide, which are biosourced heterocyclic diols;
- cyclohexanedimethanols, such as 1,2-cyclohexanedimethanol, 1,3-cyclohexanedimethanol and 1,4-cyclohexanedimethanol;
- tricyclodecanedimethanols;
- pentacyclopentanedimethanols;
- decalindimethanols, such as 2,6-decalindimethanol, 1,5-decalindimethanol and 2,3-decalindimethanol;
- norbornanedimethanols, such as 2,3-norbornanedimethanol and 2,5-norbornanedimethanol;
- adamantanedimethanols, such as 1,3-adamantanedimethanol;
- cyclohexanediols, such as 1,2-cyclohexanediol, 1,3-cyclohexanediol and 1,4-cyclohexanediol;
- tricyclodecanediols;
- pentacyclopentadecanediols;
- decalindiols;
- norbornanediols;
- adamantanediols;
- spiroglycol; 2,2,4,4-tetramethyl-1,3-cyclobutanediol;
- di-O-methylene-D-glucitol and dimethyl di-O-methylene-D-glucarate.

The aromatic cyclic diol can be chosen in particular from the following diols:
- 1,4-benzenedimethanol;
- 1,3-benzenedimethanol;
- 1,5-benzenedimethanol;
- 2,5-furandimethanol;
- Naphthalene2,6-dicarboxylate.

The aromatic cyclic triol can be chosen from the following triols: pyrogallol, hydroxyquinol or phloroglucinol.

Monomers other than (A1), (A2), (B1) and (B2) can be introduced according to the process of the invention.

It is possible, for example, to introduce monomers comprising more than two alcohol or alkyl carbonate functional groups. Monomers comprising several functional groups chosen from the carboxylic acid, carboxylic acid ester or amine functional group or mixtures of these functional groups can also be introduced. Other monomers, such as dianhydrohexitol monoalkyl carbonate, oligomers of (A1) with a degree of polymerization of greater than or equal to 3, can also be introduced.

It is also possible to introduce other products or else other product mixtures, such as dianhydrohexitol dialkyl ether, dianhydrohexitol monoalkyl ether or dianhydrohexitol monoalkyl ether monoalkyl carbonate, which can be synthesis coproducts of (A1) or (A2). It is also possible to introduce chain-terminating agents, which are compounds comprising only one functional group capable of reacting with an alcohol or carbonate functional group.

However, with regard to the total amount of monomers introduced into the reactor, it is preferable for the sum of (A1), (A2), (B1) and (B2) to constitute more than 90 molar % of the total amount of the monomers introduced, advantageously more than 95%, indeed even more than 99%. Very preferentially, the monomers introduced into the reactor are essentially composed of (A1), (A2), (B1) and (B2). Very obviously, it is preferred to limit the amount of diaryl carbonate and of halogenated monomers introduced, for example to amounts of less than 5% of the total number of moles of monomers introduced. In a particularly preferred embodiment, no monomer chosen from diaryl carbonates and halogenated monomers is introduced.

Molar Ratio of (A1) and (A2) with Respect to (B1) and (B2)

The molar ratio in the reactor of (A1) and (A2) with respect to (B1) and (B2) corresponds to the following formula:

$$\frac{\left[\frac{(A1)}{2} + \frac{(A2)}{2}\right]}{\left[\frac{(B1)}{2} + \frac{(B2)}{3}\right]} < 1$$

Advantageously, the molar ratio in the reactor of (A1) and (A2) with respect to (B1) and (B2) as defined above is strictly less than 1 and greater than 0.5, in particular strictly less than 1 and greater than 0.7, more particularly strictly less than 1 and greater than 0.9.

The very specific choice of this molarity and thus of this excess of the other diol (B1) and/or triol (B2) results in oligocarbonate polyols exhibiting a hydroxyl functional group at each chain end, which makes them useful for the preparation of polymers, such as polyurethanes.

The lower the ratio, the lower the molar mass of the oligocarbonate obtained.

The order of the introduction stages (1) and (2) is not important. Stage (1) can be carried out before stage (2) or vice versa. These two stages can also be carried out simultaneously. According to one alternative form, a premix of (A1) and/or (A2) and (B1) and/or (B2) is prepared before introducing them into the reactor. When the dimer (A2) is used in the process, it can be introduced as a mixture with (A1). This mixing can, for example, be carried out directly according to the synthesis process described in the international patent application No. WO 2012/136942. In the case where mixtures of monomers or dimers are introduced, the amount of each of these monomers can be determined by chromatographic methods, such as, for example, gas chromatography (GC).

For example, in order to determine the amounts of (A1) and (A2) of a mixture, the amounts of each of the constituents can be measured by GC by performing the analysis in the form of trimethylsilyl derivatives.

The sample can be prepared according to the following method: 500 mg of sample and 50 mg of glucose pentaacetate (internal standard) of known purity are weighed out in a beaker. 50 ml of pyridine are added and stirring is allowed to take place until dissolution is complete. 1 ml are taken up in a cup, 0.5 ml of bis(trimethylsilyl)trifluoroacetamide is added and then heating is carried out at 70° C. for 40 minutes.

To produce the chromatogram, use may be made of a Varian 3800 chromatograph equipped:
- with a DB1 column having a length of 30 m and a diameter of 0.32 mm with a film thickness of 0.25 pm,
- with an injector of 1177 type equipped with a Focus Liner with glass wool and heated to 300° C. using a split ratio of 30, the helium flow rate being 1.7 ml/min,
- with an FID detector heated to a temperature of 300° C. regulated with a sensitivity of $10^{-11}$.

1.2 µl of the sample can be introduced, in split mode, into the chromatograph, the column being heated from 100° C. up to 320° C. with a gradient of 7° C./min and then a stationary phase of 15 min at 320° C. Under these analytical conditions, when (A1) is isosorbide bis(methyl carbonate) and (A2) is dimers of (A1), (A1) has a relative retention time of approximately 0.74, (A2) has a relative retention time ranging from approximately 1.34 to 1.79, the internal standard having a retention time of approximately 15.5 minutes.

Using the chromatogram, the mass percentage of each of the constituents can be calculated by determining the area of the corresponding peaks and by calculating, for each constituent, the ratio of the area of the peak corresponding to it to the total area of all of the peaks (except for the internal standard peak).

Polycondensation Reaction by Transesterification

In order to make possible the formation of the polycarbonate according to the process of the invention, the monomer (A1) and/or the dimer (A2) reacts with the monomer (B1) and/or (B2) by a transesterification reaction, this reaction being carried out in a reactor.

This reaction can take place in the absence of catalyst. However, the presence of an appropriate catalyst makes it possible to accelerate the reaction and/or to increase the degree of polymerization of the polycarbonate thus formed during stage (3).

The type and the conditions of the condensation transesterification of stage (3) are not particularly limited.

However, stage (3) advantageously takes place in the presence of a known catalyst of polycondensation by transesterification, advantageously a catalyst comprising at least one alkali metal or alkaline earth metal ion, one quaternary ammonium ion, one quaternary phosphonium ion, one cyclic nitrogenous compound, one basic boron-based compound or one basic phosphorus-based compound.

Mention may be made, as example of catalyst comprising at least one alkali metal ion, of cesium, lithium, potassium or sodium salts. These salts can in particular be carbonates, hydroxides, acetates, stearates, borohydrides, borides, phosphates, alkoxides or phenoxides and also their derivatives.

Mention may be made, as catalyst comprising at least one alkaline earth metal ion, of calcium, barium, magnesium or strontium salts. The salts can in particular be carbonates, hydroxides, acetates or stearates and also their derivatives.

As regards the basic boron-based compounds, they are preferably salts of alkyl or phenyl boron derivatives, such as tetraphenylboron.

The catalysts comprising basic phosphorus-based compounds can be phosphines. The catalysts comprising a quaternary ammonium ion are preferentially hydroxides, such as tetramethylammonium hydroxide.

The catalysts comprising a cyclic nitrogenous compound are preferentially triazole, tetrazole, pyrrole, pyrimidine, pyrazine, pyridazine, picoline, piperidine, pyridine, aminoquinoline or imidazole derivatives.

Preferentially, the catalyst is chosen from catalysts comprising at least one alkali metal ion, catalysts comprising a cyclic nitrogenous compound and catalysts comprising a quaternary ammonium ion, such as cesium carbonate, triazoles or tetramethylammonium hydroxide, very preferentially cesium carbonate.

The molar amount of optional catalyst, with respect to the amount of (A1) and (A2), advantageously ranges from $10^{-7}$% to 1%, preferentially from $10^{-4}$% to 0.5%. Its amount can be adjusted as a function of the catalyst used. By way of example, use is preferentially made of $10^{-3}$% to $10^{-1}$% of catalyst comprising at least one alkali metal ion.

Additives, such as stabilizers, can optionally be added to (A1) and/or (A2) and (B1) and/or (B2).

The stabilizer can, for example, be a compound based on phosphoric acid, such as trialkyl phosphates, based on phosphorous acid, such as phosphite or phosphate derivatives, or a salt of these acids, for example zinc salts; this stabilizer makes it possible to limit the coloring of the polymer during its manufacture. Its use can be advantageous in particular when the polycondensation is carried out in the molten state. However, the amount of stabilizing agent is generally less than 0.01% of the total number of moles of (A1), (A2), (B1) and (B2). In the polycarbonate manufacturing process according to the invention, the stage of polycondensation of (A1) and/or (A2) and (B1) and/or (B2) is carried out during stage (3). The type and the conditions of the polymerization are not particularly limited. This reaction can be carried out in the molten state, that is to say by heating the reaction medium in the absence of solvent. This polymerization can also be carried out in the presence of solvent. This reaction is preferably carried out in the molten state.

Stage (3) is carried out for a time sufficient to obtain a polycarbonate. Advantageously, the duration of stage (3) ranges from 1 hour to 24 hours, for example from 2 to 12 hours.

At least a part of stage (3) of the process according to the invention can be carried out at a temperature ranging from 100° C. to 250° C., preferentially from 150° C. to 235° C. Preferentially, the reactor is heat-regulated during stage (3) at a temperature ranging from 100° C. to 250° C., preferentially from 150° C. to 235° C.

It is possible to carry out all of stage (3) under isothermal conditions. However, it is generally preferred to increase the temperature during this stage, either by stepwise increases in temperature or by using a temperature gradient. This increase in temperature during stage (3) makes it possible to improve the degree of progression of the polycondensation reaction by transesterification and thus to increase the molecular weight of the polycarbonate finally obtained, the latter in addition exhibiting a less intense coloring than when the whole of stage (3) of the process is carried out at its highest temperature.

Of course, it is preferred to carry out stage (3) under an inert atmosphere, for example under nitrogen.

A vacuum in the reactor is not necessary to remove the alcohols generated during the process according to the invention since the alcohols generated can be distilled off more easily than phenol. The process according to the invention thus exhibits the advantage that the stage of polycondensation by transesterification does not necessarily take place under high vacuum. Thus, according to an alternative form of the process of the invention, at least a part of stage (3) is carried out at a pressure ranging from 30 to 110 kPa, advantageously from 50 to 105 kPa, preferentially from 90 to 105 kPa, for example at atmospheric pressure. Preferentially, at least half of the total duration of stage (3) is carried out at this pressure.

However, it is possible to carry out stage (3), throughout the duration or during a part, under a slightly more forceful vacuum, for example with a pressure inside the reactor of between 100 Pa and 20 kPa. Of course, this vacuum is adjusted according to the temperature inside the reactor and the degree of polymerization: when the degree of polymerization is low, in the event of an excessively low pressure and an excessively high temperature, the reaction may not take place correctly because the monomers are extracted from the reactor by distillation. This stage of slightly more forceful vacuum can be carried out at the end of the reaction, which moreover makes it possible to remove some of the residual entities.

The reactor is generally equipped with a means for removal of the alcohols generated during the polycondensation reaction by transesterification, for example a distillation head connected to a condenser.

The reactor is generally equipped with a stirring means, such as a paddle stirring system.

The monomer (A1) and/or the dimer (A2) exhibit the advantage of reacting alternately with the monomers (B1) and/or (B2) during stage (3). The reaction thus results in an oligomer having an alternating architecture.

It is possible to carry out one or more stages of additional introductions of monomers (B1) and/or (B2), this/these taking place after the initiating of the condensation transesterification stage (3).

The process can be carried out batchwise, continuously, or semi-continuously semi-batchwise.

The oligocarbonate formed during the process is recovered during stage (4). This oligocarbonate can be directly converted into the form of granules by means of a granulator or into any other form. It is also possible to carry out a purification of the product thus obtained in a stage subsequent to stage (4), for example by dissolution of the product in a solvent, such as chloroform, followed by precipitation by addition of a nonsolvent, such as methanol.

It is possible, by virtue of the process of the invention, to obtain a yield by weight, defined by the ratio of the weight of oligocarbonate recovered to the weight of the sum of the monomers or dimers employed, of greater than or equal to 60%, advantageously of greater than 70%, preferably of greater than 80%.

Another subject matter of the present invention is an oligocarbonate polyol capable of being obtained by the process according to the invention as defined above.

Advantageously, the oligocarbonate polyol according to the invention comprises a phenol content of less than 50 ppb.

The residual phenol content is measured by gas chromatography on a sample which has been completely hydrolyzed beforehand by acid hydrolysis. A person skilled in the art can easily carry out the acid hydrolysis of the oligocarbonates and analyze the crude reaction product by gas chromatography with an internal standard in order to measure a quantitative response.

The oligocarbonate polyol obtained by the process according to the invention exhibits a molar mass of less than 5000 g/mol and chain end groups of hydroxyl type.

It is possible to reduce, respectively increase, the molar mass of the oligocarbonate by reducing, respectively increasing, the amount of monomers (B1) and/or (B2) employed in stage (3) with respect to that of (A1) and/or (A2).

It is possible to reduce, respectively increase, the degree of branching of the oligocarbonate by reducing, respectively increasing, the amount of monomer (B2) employed in stage (3) with respect to that of (B1).

The higher the degree of branching of the oligocarbonate, the greater the crosslinking density of the polymeric material obtained from this oligomer.

The oligocarbonate polyol obtained by the process according to the invention moreover exhibits an OH number of greater than 100 mg KOH/g.

Another subject-matter of the present invention is a process for the preparation of a polymeric material, characterized in that the oligocarbonate polyol according to the invention is reacted with a monomer exhibiting at least two functional groups, each capable of reacting with a hydroxyl functional group.

The polymeric material according to the invention can be intended in particular for the preparation of an adhesive, of a paint, of a lacquer, of a varnish or of a resin, in particular a polyurethane resin.

According to one embodiment, the monomer exhibiting at least two functional groups, each capable of reacting with a hydroxyl functional group is a polyisocyanate, in particular a diisocyanate. The process according to the invention consequently results in a polycarbonate-urethane.

According to a specific embodiment, the monomer exhibiting at least two functional groups, each capable of reacting with a hydroxyl functional group, is a linear or cyclic aliphatic diisocyanate or an aromatic diisocyanate.

Another subject-matter of the present invention is a polycarbonate capable of being obtained by the abovementioned process, that is to say by reacting the oligocarbonate polyol according to the invention with a polyisocyanate, in particular a diisocyanate.

The polyisocyanate consists of a polyisocyanate or a mixture of polyisocyanates.

"Polyisocyanate" is understood to mean, within the meaning of the present invention, a compound having an —NCO functionality of greater than or equal to 2. The term polyisocyanate thus includes in particular diisocyanates having an —NCO functionality equal to 2, triisocyanates having an —NCO functionality equal to 3, and also polyisocyanates having an —NCO functionality strictly of greater than 2 and strictly of less than 3.

"—NCO functionality" is understood to mean, within the meaning of the present invention, the total number of reactive isocyanate functional groups per mole of compound.

"Aliphatic polyisocyanate" is understood to mean, within the meaning of the present invention, a polyisocyanate which does not contain an aromatic ring. The term aliphatic polyisocyanate thus includes noncyclic aliphatic polyisocyanates and cycloaliphatic polyisocyanates.

According to one embodiment, the polyisocyanate is an aliphatic polyisocyanate having an —NCO functionality strictly of greater than 2, chosen in particular from a diisocyanate trimer, more particularly a diisocyanate isocyanurate or a diisocyanate biuret corresponding to the following formulae:

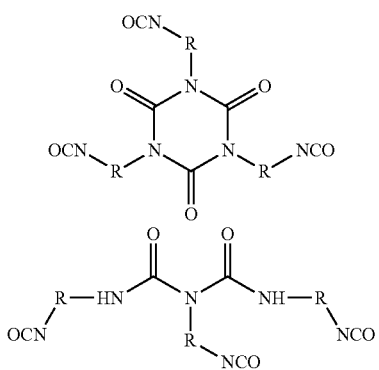

in which R is a $C_4$-$C_{30}$ alkylene group, preferably a $C_4$-$C_{20}$ alkylene group.

"$C_4$-$C_{30}$ alkylene group" is understood to mean, within the meaning of the present invention, a divalent hydrocarbyl radical comprising from 4 to 30 carbon atoms which is saturated or partially saturated, which is linear or branched and which can comprise an aliphatic ring.

According to a specific embodiment, the aliphatic polyisocyanate having an —NCO functionality strictly of greater than 2 is chosen from a pentamethylene diisocyanate (PDI) trimer, a hexamethylene diisocyanate (HDI) trimer, an isophorone diisocyanate (IPDI) trimer or one of their mixtures, preferably an IPDI trimer or a PDI trimer.

According to one embodiment, the polyisocyanate is a noncyclic aliphatic diisocyanate. Preferably, the noncyclic aliphatic diisocyanate is chosen from pentamethylene diisocyanate (PDI), hexamethylene diisocyanate (HDI), isophorone diisocyanate (IPDI), methylenedicyclohexyl diisocyanate (HMDI or hydrogenated MDI) or one of their mixtures; more preferentially IPDI.

According to one embodiment, the aromatic polyisocyanate is chosen from 1,3-phenylene diisocyanate, toluene-2,4-diisocyanate, toluene-2,6-diisocyanate, diphenyl-3,3'-dimethyl-4,4'-diisocyanate, diphenyl-3,3'-dimethoxy-4,4'-diisocyanate, diphenyl methane-4,4'-dimethyl-3,3'-diisocyanate, naphthalene-1,5-diisocyanate, 1-methoxyphenyl-2,4-diisocyanate, methylenebis(4,4'-phenyl isocyanate) or one of their mixtures, or else from 4,4',4''-triphenylmethane triisocyanate, 4,4',4''-triphenylmethane triisocyanate, polymethylene polyphenylisocyanate, tolylene-2,4,6-triisocyanate or one of their mixtures.

The polycarbonate according to the invention is characterized in that its molar mass is greater than 5000 g/mol.

According to one embodiment, the polycarbonate according to the invention exhibits a maximum flexural stress of greater than 1800 MPa, as measured according to Standard ISO 178:2010.

According to one embodiment, the polycarbonate according to the invention exhibits a notched impact strength of greater than 20 kJ/m², as measured according to the Charpy method DIN EN ISO 179:2010.

According to one embodiment, the polycarbonate according to the invention does not break during an unnotched Charpy test according to Standard DIN EN ISO 179:2010.

According to one embodiment, the polycarbonate according to the invention exhibits an elongation at break in tension of greater than 50%, as measured according to Standard ISO 527-1:2012.

Embodiments will now be described in detail in the examples which follow. It is pointed out that these illustrative examples do not in any way limit the scope of the present invention.

EXAMPLES

Analytical Methods Used:

DSC: Measurement of Tg

The thermal properties of the polyesters were measured by differential scanning calorimetry (DSC): The sample is first of all heated under a nitrogen atmosphere in an open crucible from 10° C. to 280° C. (10° C. min$^{-1}$), cooled to 10° C. (10° C. min$^{-1}$), then heated again to 320° C. under the same conditions as the first stage. The glass transition temperatures (Tg) were taken at the mid-point of the second heating. Any melting points are determined on the endothermic peak (peak onset) in the first heating. Likewise, the enthalpy of fusion (area under the curve) is determined in the first heating.

Size Exclusion Chromatography: Measurement of Mn

As regards the Mn, it is determined by size exclusion chromatography in THF using polystyrene standards. The sample is prepared by dissolution in THF to a concentration of 5 mg/ml.

Alcohol Number (OHN) Determination

The OH number is determined by $^1$H NMR via a derivatization technique by addition of trifluoroacetic anhydride and of α,α,α-trifluorotoluene as internal standard.

For this, 10 mg of oligocarbonate diol are dissolved in 0.6 ml of CDCl$_3$, TFAA is then added in excess and reacted for 24 h. 10 μl of α,α,α-trifluorotoluene (internal standard) are added before analysis by $^1$H NMR.

The OH content is determined by comparing the integrations of the peaks between 5.4 and 5.6 ppm (representing the signals of the protons a to the derivatized OH groups) to the sum of the integrals of the peaks between 1.4 and 1.9 ppm and between 4.05 and 4.15 ppm. A person skilled in the art can easily find the OH number once Adhesion The adhesion is measured according to Standard ASTM D3359-09.

Mechanical Properties

The mechanical properties of the polymers were evaluated according to the following standards:
Flexural test: determination of the maximum flexural stress (Standard ISO 178:2010).
Tensile test: determination of the elongation at break in tension (Standard ISO 527-1:2012).

Impact strength: determination of the Charpy impact characteristics (Standard DIN EN ISO 179-1:2010; unnotched: ISO 179/1eU or notched: ISO 179/1eA).

Examples of Synthesis of Oligocarbonates According to the Invention

Isosorbide bis(methyl carbonate), of use in the process for the manufacture of the polycarbonate diol oligomers according to the invention, is obtained according to the protocol described below.

Synthesis of Isosorbide bis(methyl carbonate) (IBMC)

800 g of isosorbide (5.47 mol) and then 5362 g of dimethyl carbonate (=20 equivalents of dimethyl carbonate) and 2266 g of potassium carbonate are introduced into a 20-liter reactor, heated by a thermostatically controlled heat-transfer fluid bath, equipped with a mechanical paddle stirring system, with a system for controlling the temperature of the reaction medium and with a rectification column surmounted by a reflux head. The reaction mixture is heated at total reflux for one hour, at the end of which time the temperature of the vapors at the column top reaches 64° C., before starting the removal of the methanol formed. The heating of the reaction medium at a temperature of between 68° C. and 75° C. is subsequently maintained for 13 hours, at the end of which time the temperature of the vapors at the column top reaches 90° C. and stabilizes at this temperature (boiling point of dimethyl carbonate). This is the sign that the transesterification reaction is complete and that methanol is no longer being formed.

A part of the product obtained according to Synthesis 1 is distilled off under high vacuum (<1 mbar) on a wiped-film evaporator in "short path" configuration. The evaporator is heated to 140° C. and the product is introduced at 70° C. with a flow rate of 140 g/h.

The distillate obtained is a white solid containing 100% by weight of isosorbide bis(methyl carbonate) and does not contain any trace of dimers.

Preparation of Oligocarbonates

An amount of isosorbide bis(methyl carbonate) (A1) and of diols (B1): hexanediol or butanediol and optionally isosorbide, with the amounts expressed in table 1 below, and cesium carbonate are introduced into a 200 ml reactor, heated by a ceramic oven, equipped with a mechanical paddle stirring system, with a system for controlling the temperature of the reaction medium, with a nitrogen inlet pipe, with a distillation head connected to a condenser and to a receiver for collecting the condensates, and with an adjustable vacuum system. The molar ratio (A1)/(B1) is 0.9/1. The amount of cesium carbonate is 17.1 mg ($2.5 \times 10^{-4}$ mol).

The installation is placed under a nitrogen atmosphere and the reaction medium is heated by means of the heat-transfer fluid. The temperature is gradually raised to 65° C. in order for the molten reaction medium to be homogeneous and five "vacuum (300 mbar)-nitrogen (stream)" cycles are applied before continuing the rise in temperature. The rise in temperature between each stationary phase takes place over 15 minutes. A first stationary phase takes place at a temperature of 100° C. under a nitrogen stream of 5 ml/min of nitrogen for 2 hours. The temperature is subsequently brought to 180° C. over 15 minutes and a vacuum of 50 mbar is applied. This stage lasts 3 hours.

The product is then cooled under nitrogen and poured into a sample tube when the temperature is in the region of 60° C.

Examples 1 to 5 describe the syntheses and the properties of the reactions where just one diol (B1)hexanediol or butanediol was employed, the nature of the diol (B1) having been modified.

| Example | Nature of the diol (B1) | Amount of diol B1 (g) | Amount of IBMC (A1) (g) | Tg (° C.) | OHN (mg KOH/g) | Mn (g/mol) | Appearance |
|---|---|---|---|---|---|---|---|
| Ex. 1 | butanediol | 10.65 | 29.51 | −30 | 130 | 850 | colorless liquid |
| Ex. 2 | hexanediol | 16.53 | 29.51 | −49 | 124 | 900 | colorless liquid |
| Ex. 3 | cyclohexanedimethanol | 20.18 | 29.51 | 45 | 110 | 1000 | pale yellow liquid |
| Ex. 4 | pentaerythritol | 19.06 | 29.51 | −8 | 105 | 1100 | pale yellow liquid |
| Ex. 5 | diethylene glycol | 14.85 | 29.51 | −37 | 128 | 850 | colorless liquid |

Examples 6 and 7 are synthesized from a variable diol (B1) (hexanediol or butanediol) and from isosorbide.

| | Nature variable diol (B1) | Amount isosorbide (g) | Amount variable diol (B1) (g) | Amount IBMC (A1) (g) | OHN (mg KOH/g) | Tg (° C.) | Mn (g/mol) | Appearance |
|---|---|---|---|---|---|---|---|---|
| Ex. 6 | 1,4 butanediol | 9.14 | 16.88 | 29.51 | 125 | −15 | 800 | colourless liquid |
| Ex. 7 | 1,6 hexanediol | 0.00 | 29.50 | 29.51 | 137 | −35 | 1300 | colourless liquid |

Examples of Use of Oligocarbonates According to the Invention

In the examples, the following products were used:
diisocyanate:
  isophorone diisocyanate trimer (t-IPDI) or
  isophorone diisocyanate (IPDI)
catalyst: dibutyl tin dilaurate (DBTDL)

Example 8: Use of the Oligocarbonate Polyols According to the Invention in the Manufacture of Thermosetting Resins of Polyurethane (PU) Type 5 grams of oligocarbonate polyol synthesized according to example 2 are dissolved in 5 ml of acetone with 2.34 grams of t-IPDI (with an NCO number of 12.3) and 7 mg of DBTDL are stirred until a homogeneous and transparent mixture is obtained. This mixture is homogenized in an ultrasonic bath for 5 minutes and deposited on a Q-panel substrate made of steel. The product is left in the study at 90° C. for 24 h.

The contents of insolubles in the acetone after reaction are 99.95 with regard to this product, which shows that the product has crosslinked well.

The adhesion of the coating to the Q-panel sheet is established at 4 according to Standard ASTM D3359-09.

Example 9: Synthesis of a Polycarbonate by Chain Extension with a Diisocyanate 50 grams of oligocarbonate polyol synthesized according to example 3 are dissolved in 250 ml of acetone, to which 6.3 mg of DBTDL and 12.33 grams of IPDI are added. The mixture is brought to 60° C. for 3 h and then the solvent is evaporated on a rotary evaporator and then in an oven under vacuum at 60° C. for 24 h.

The Tg of the product obtained by DSC is 105° C. The molar mass (Mn) of this polycarbonate is 12 600 g/mol, obtained by SEC in THF solvent with a polystyrene calibration.

The product obtained is subsequently melted and poured into a mould in order to obtain test specimens for the study of the flexural mechanical properties and the evaluation of the resistance to Charpy impacts.

The flexural modulus is 2030 MPa.

The unnotched bars do not break during the Charpy tests.

The notched tests show mean values over five test specimens of 30 kJ/m$^2$.

The invention claimed is:

1. A process for the preparation of a polycarbonate-urethane, wherein an oligocarbonate polyol is reacted with a polyisocyanate, wherein the oligocarbonate polyol is obtained by a second process comprising the steps of:
  a stage (1) of introduction, into a reactor:
    of a monomer of formula (A1):

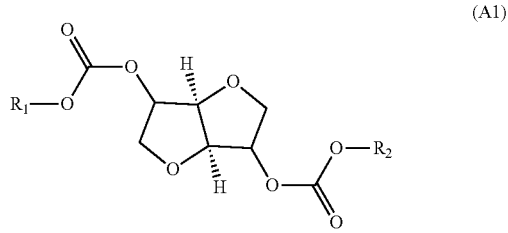

in which $R_1$ and $R_2$ are identical or different alkyl groups, or of a dimer of formula (A2):

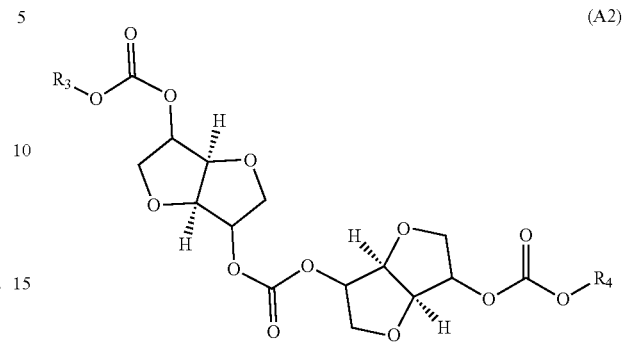

in which $R_3$ and $R_4$ are identical or different alkyl groups, or of a mixture of (A1) and (A2);
  a stage (2) of introduction, into the reactor, of a diol monomer (B1) or of a triol monomer (B2) or of a mixture of (B1) and (B2), (B1) and (B2) both being different from (A1) and (A2);
  the molar ratio in the reactor of (A1) and (A2) with respect to (B1) and (B2) corresponding to the following formula:

$$\frac{\left[\frac{(A1)}{2} + \frac{(A2)}{2}\right]}{\left[\frac{(B1)}{2} + \frac{(B2)}{3}\right]} < 1,$$

a subsequent stage (3) of polycondensation by transesterification of the monomers and dimers (A1), (A2), (B1) and (B2) in order to obtain an oligocarbonate polyol having a molar mass of less than 5000 g/mol and two or more hydroxyl chain end groups, and
  a stage (4) of recovery of the oligocarbonate polyol;
wherein the diol monomer (B1) is chosen from ethylene glycol, 1,3-propanediol, 1,4-butanediol, 1,5-pentanediol, 1,6-hexanediol, 1,8-octanediol or 1,10-decanediol, 1,2-propanediol, 1,3-butanediol, 2,3-butanediol, 1,3-pentanediol, 1,4-hexanediol, 2,2-dimethyl-1,3-propanediol, 3-methyl-1,5-pentanediol, 2,2-dimethyl-1,3-propanediol or 2-methyl-1,3-propanediol or from the following cyclic diols:
  cyclohexanedimethanols;
  tricyclodecanedimethanols;
  pentacyclopentanedimethanols;
  decalindimethanols;
  norbornanedimethanols;
  adamantanedimethanols,
  cyclohexanediols,
  tricyclodecanediols,
  pentacyclopentadecanediols,
  decalindiols,
  norbornanediols,
  adamantanediols,
  spiroglycol,
  2,2,4,4-tetramethyl-1,3-cyclobutanediol;
  di-O-methylene-D-glucitol and dimethyl di-O-methylene-D-glucarate.

2. The process as claimed in claim 1, wherein the monomer (A1) is introduced into the reactor in stage (1) alone or as a mixture with the dimer (A2).

3. The process as claimed in claim 1, wherein the molar ratio in the reactor of (A1) and (A2) with respect to (B1) and (B2), corresponding to the following formula:

$$\frac{\left[\frac{(A1)}{2} + \frac{(A2)}{2}\right]}{\left[\frac{(B1)}{2} + \frac{(B2)}{3}\right]}$$

is strictly less than 1 and greater than 0.5.

4. The process as claimed in claim 1, wherein $R_1$, $R_2$, $R_3$ and $R_4$ are independently chosen from alkyl groups comprising from 1 to 10 carbon atoms.

5. The process as claimed in claim 2, wherein the monomer (A1) is an isosorbide bis(alkyl carbonate).

6. The process as claimed in claim 1, wherein the triol monomer (B2) is chosen from aliphatic diols and triols, branched aliphatic diols and triols and cyclic aliphatic diols and triols.

7. The process as claimed in claim 1, wherein stage (3) takes place in the presence of a catalyst of polycondensation by transesterification.

8. The process as claimed in claim 7, wherein the molar amount of catalyst with respect to the amount of the monomer (A1) and of the dimer (A2) advantageously ranges from $10^{-7}$% to 1% by weight.

9. The process as claimed in claim 1, wherein stage (3) is carried out under an inert atmosphere.

10. The process as claimed in claim 1, wherein a part of stage (3) is carried out at a temperature ranging from 100° C. to 250° C.

11. The process as claimed in claim 1, wherein the oligocarbonate polyol comprises a phenol content of less than 50 ppb.

12. The process as claimed in claim 1, wherein the polyisocyanate is a diisocyanate.

13. The process as claimed in claim 12, wherein the diisocyanate is a linear or cyclic aliphatic diisocyanate.

14. A polycarbonate-urethane obtained by the process as claimed in claim 1, having a molar mass greater than 5000 g/mol.

15. The polycarbonate-urethane as claimed in claim 14, exhibiting a maximum flexural stress of greater than 1800 MPa, as measured according to Standard ISO 178:2010.

16. The polycarbonate-urethane as claimed in claim 14, exhibiting a notched impact strength of greater than 20 kJ/m$^2$, as measured according to the Charpy method DIN EN ISO 179:2010.

17. The polycarbonate-urethane as claimed in claim 14, that wherein the polycarbonate does not break during an unnotched Charpy test according to Standard DIN EN ISO 179:2010.

18. The polycarbonate-urethane as claimed in claim 14, exhibiting an elongation at break in tension of greater than 50%, as measured according to Standard ISO 527-1:2012.

* * * * *